United States Patent [19]

Southwell

[11] Patent Number: 4,583,822
[45] Date of Patent: Apr. 22, 1986

[54] QUINTIC REFRACTIVE INDEX PROFILE ANTIREFLECTION COATINGS

[75] Inventor: William H. Southwell, Thousand Oaks, Calif.

[73] Assignee: Rockwell International Corporation, El Segundo, Calif.

[21] Appl. No.: 666,799

[22] Filed: Oct. 31, 1984

[51] Int. Cl.$^4$ .......................... B05D 5/06; G02B 1/10
[52] U.S. Cl. ..................................... 350/164; 350/1.6; 427/162
[58] Field of Search ........................ 350/1.6, 164, 165; 427/162

[56] References Cited

U.S. PATENT DOCUMENTS

| | | | |
|---|---|---|---|
| 2,281,474 | 4/1942 | Cartwright et al. | 350/164 |
| 2,376,428 | 5/1945 | Hansell | 350/164 |
| 2,397,929 | 4/1946 | Dimmick | 350/164 |

OTHER PUBLICATIONS

Snedaker, New Numerical Thin-Film Synthesis Technique, Journal of the Optical Society of America, vol. 72, p. 1732 (1982).
Yadava, et al., Optical Behavior of Gradient-Index Multilayer Films, Thin Solid Films, vol. 21, p. 297 (1974).
Dobrowolski, Completely Automatic Synthesis of Optical Thin Film Systems, Applied Optics, vol. 4, p. 937 (1965).
Epstein, The Design of Optical Filters, Journal of the Optical Society of America, vol. 42, p. 806 (1952).
Minot, Single-layer, Graded Refractive Index Antireflection Films Effective from 0.35 to 2.5 $\mu$, Journal of the Optical Society of America, vol. 66, p. 515 (1976).

Primary Examiner—John K. Corbin
Assistant Examiner—Bruce S. Shapiro
Attorney, Agent, or Firm—H. Fredrick Hamann; Craig O. Malin; John J. Deinken

[57] ABSTRACT

An antireflective optical film exhibits a quintic refractive index profile with an initial refractive index $n_L$ as close as possible to the refractive index of the incident medium and a final refractive index $n_H$ substantially equal to the refractive index of the substrate. The refractive index profile of the film may be defined by the relationship:

$$n(x) = n_L + (n_H - n_L)(10(x/T)^3 - 15(x/T)^4 + 6(x/T)^5),$$

where N(x) is the refractive index of the film at a depth x in the film relative to the incident surface of the film and T is the thickness of the film. The film may also be fabricated as a plurality of layers, with each layer substantially thinner than wavelengths within the spectral band. Each layer within the plurality is divided into a sublayer pair, including a first sublayer with the refractive index $n_L$ and a second sublayer with the refractive index $n_H$, such that the refractive index of each sublayer pair approximates the average refractive index of the corresponding layer as defined by the quintic profile. Each of the layers obeys the relationships:

$$t_H = t(n^2 - n_L^2)/(n_H^2 - n_L^2) \text{ and}$$

$$t_L = t - t_H$$

where t is the thickness of the layer, n is the average refractive index of the layer, $t_H$ is the thickness of the sublayer with the refractive index $n_H$, and $t_L$ is the thickness of the sublayer with the refractive index $n_L$.

10 Claims, 9 Drawing Figures

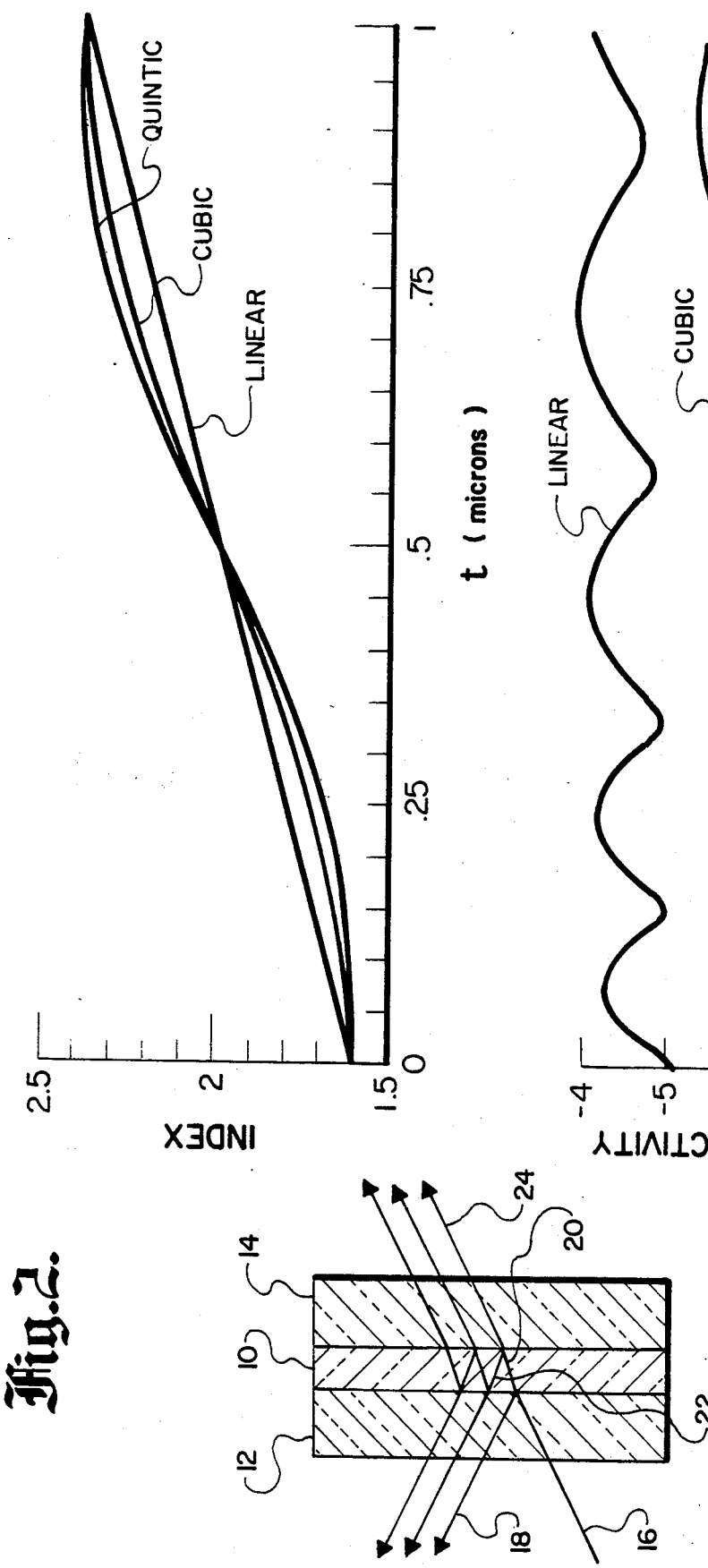
Fig. 2.
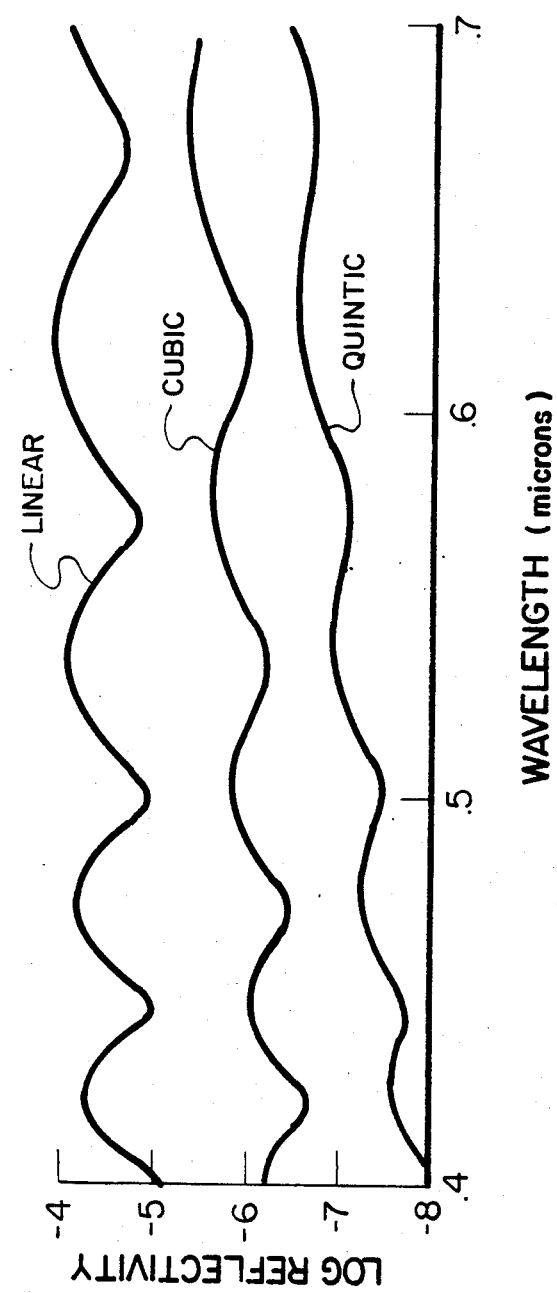
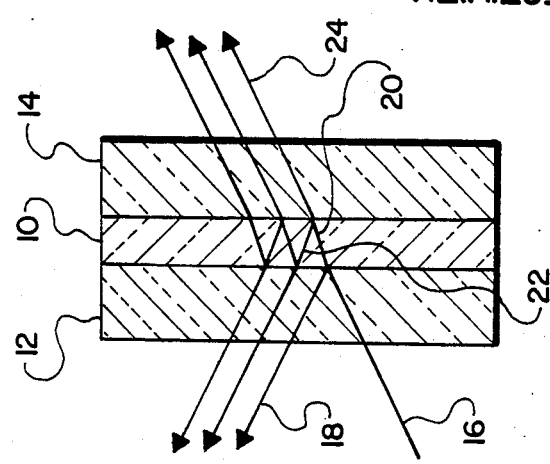
Fig. 1.
Fig. 3.

QUINTIC REFRACTIVE INDEX PROFILE ANTIREFLECTION COATINGS

BACKGROUND OF THE INVENTION

This invention relates to optical coatings for reducing the amount of light which is reflected from an optical surface.

The modification of the intensity of light which may occur when two or more beams of light are superposed is known as interference. The principle of superposition states that the resultant amplitude is the sum of amplitudes of the individual beams. The brilliant colors, for example, which may be seen when light is reflected from a soap bubble or from a thin layer of oil floating on water are produced by interference effects between the two trains of light waves which are reflected at opposite surfaces of the thin film of soap solution or of oil.

One important application of the principles of interference in thin films has been the production of coated optical surfaces. If a film of a transparent substance is deposited on glass, for example, with a thickness which is one quarter of the wavelength of light in the film, the reflection of that light from the glass surface can be almost completely suppressed. The light which would otherwise be reflected is not absorbed by a nonreflecting film; rather, the energy in the incident light is redistributed so that a decrease in reflection is accompanied by a concomitant increase in the intensity of the light which is transmitted.

Nonreflecting films are of practical importance because they can be used to greatly reduce the loss of light by reflection at the various surfaces of an optical system. Stray light which could otherwise reach the image because of these reflections can also be substantially eliminated, with a resulting increase in contrast. Such improvements are particularly useful where an image is formed by a highly corrected lens system which has a large number of air-glass surfaces. Consequently, almost all optical components of high quality are coated to reduce reflection. These coatings were first made by depositing several monomolecular layers of an organic substance on glass plates. More durable coatings may be fabricated by evaporating calcium or magnesium fluoride on the surface in a vacuum, or by chemical treatment with acids which leave a thin layer of silica on the surface of the glass.

Considerable improvements have been achieved in the antireflective performance of such films by using a composite film having two or more superimposed layers. The use of gradient layers, in which the index of refraction within the layer varies continuously as a function of depth in the layer, further increases the degrees of freedom available in the design of such films. Modern applications of optical technology, however, require antireflective films with even lower levels of reflection, wider spectral regions, and broader angles of incidence than have previously been attainable in the art. It is the goal of this invention to further advance the performance of antireflective coatings by providing a new gradient index profile for such films.

SUMMARY OF THE INVENTION

The invention provides an antireflective optical film which, when placed between an incident medium and a substrate, effects minimal reflectivity from the incident-substrate interface over a broad spectral band. The film exhibits a quintic refractive index profile with an initial refractive index $n_L$ as close as possible to the refractive index of the incident medium and a final refractive index $n_H$ substantially equal to the refractive index of the substrate. If the incident medium is not air, the initial refractive index should be made substantially equal to the refractive index of the medium.

In a more particular embodiment, the refractive index profile of the film is defined by the relationship:

$$n(x) = n_L + (n_H - n_L)(10(x/T)^3 - 15(x/T)^4 + 6(x/T)^5)$$

where $n(x)$ is the refractive index of the film at a depth $x$ in the film relative to the incident surface of the film and $T$ is the thickness of the film.

The film may also be fabricated as a plurality of layers, with each layer substantially thinner than wavelengths within the spectral band. Each layer within the plurality is divided into a sublayer pair, including a first sublayer with the reflect $n_L$ and a second sublayer with the refractive index $n_H$, such that the refractive index of each sublayer pair approximates the average refractive index of the corresponding layer as defined by the quintic profile.

In a more particular embodiment of the layered film, each of the layers obey the relationships:

$$t_H = t(n^2 - n_L^2)/(n_H^2 - n_L^2) \text{ and}$$

$$t_L = t - t_H$$

where $t$ is the thickness of the layer, $n$ is the average refractive index of the layer, $t_H$ is the thickness of the sublayer with the refractive index $n_H$, and $t_L$ is the thickness of the sublayer with the refractive index $n_L$.

The invention also provides a method of making such an antireflective optical film, which begins with selecting a theoretical film having a quintic refractive index profile with an initial refractive index $n_L$ as close as possible to the refractive index of the incident medium and a final refractive index $n_H$ substantially equal to the refractive index of the substrate. The theoretical film is then divided into a plurality of layers each substantially thinner than wavelengths within the spectral band. The average refractive index is determined for a selected layer according to the osition of the sublayer pair approximates the theoretical reflectivity of the selected layer in the gradient index profile and the selected layer is subdivided into a sublayer pair, including a sublayer with the refractive index $n_L$ and a sublayer with the refractive index $n_H$, such that the reflectivity of the selected sublayer pair approximates the theoretical reflectivity of the layer. The steps of determining and subdividing are repeated for each of the plurality of layers, then a plurality of sublayer pairs corresponding to the theoretical sublayer pairs are deposited on the substrate, thereby making an optical film which effects a reflectivity approximating that of the theoretical quintic index profile.

In one more particular embodiment of the method, prior to the step of depositing the reflectivity of the film is evaluated, a layer is selected, and the thicknesses of the corresponding sublayers are changed to change the refractive index of the layer. The reflectivity of the film is then reevaluated and the changed thicknesses are assigned to the selected sublayers if the reflectivity is improved. These steps are repeated a predetermined number of times for each layer.

In a second more particular embodiment, the step of subdividing involves subdividing the selected layer into a sublayer pair, including a sublayer with the refractive index $n_L$ and a sublayer with the refractive index $n_H$, such that $$t_H = t(n^2 - n_L^2)/(n_H^2 - n_L^2) \text{ and}$$

$$t_L = t - t_H$$

where n is the theoretical refractive index of the selected layer, $t_L$ is the thickness of the sublayer with the refractive index $n_L$, $t_H$ is the thickness of the sublayer with the refractive index $n_H$, and t is the thickness of the sublayer pair.

DESCRIPTION OF THE DRAWINGS

Additional details of the invention are presented in the section entitled Description of the Invention, which refers to the following drawings:

FIG. 1 is a cross sectional side view of an optical interface with an antireflective film.

FIG. 3 is a calculated plot displaying the log of reflectivity as a function of wavelength for the three profiles of FIG. 2.

FIG. 7 is a plot similar to FIG. 3 showing the reflectivity performance of the profile shown in FIG. 3.

DESCRIPTION OF THE INVENTION

Figures 4, 5:
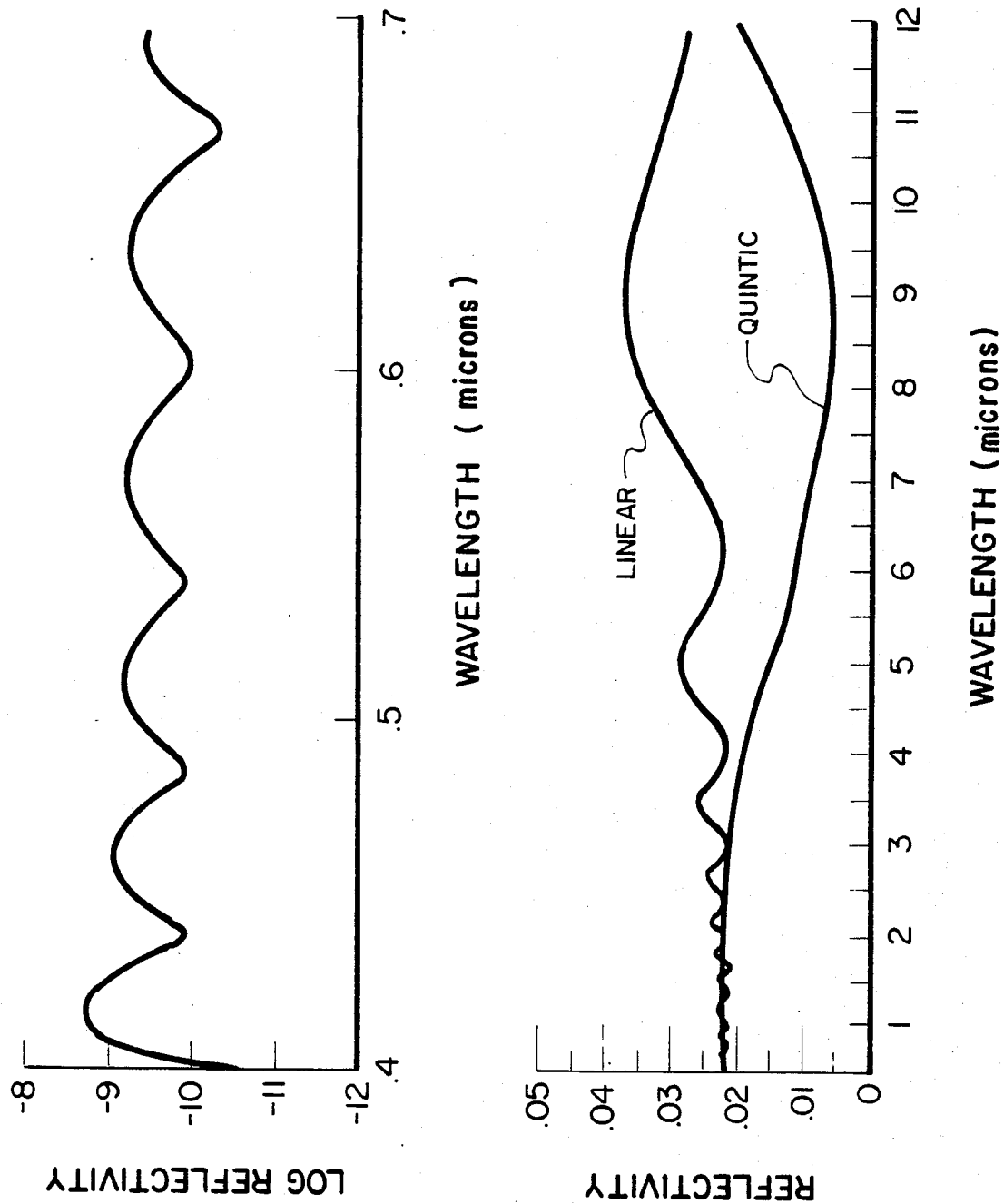
FIG. 4 is a plot similar to FIG. 3 displaying the reflectivity of the quintic profile after the application of a synthesis enhancement technique.
FIG. 5 is a plot similar to FIG. 3 showing the reflectivity calculated for a ZnSe:CaF$_2$ film with linear and quintic index profiles.

This invention addresses the problem of designing a high performance gradient index antireflective coating. That is, given the capability of producing a coating with a continuously varying refractive index, what is the optimum index distribution to satisfy established performance requirements?

FIG. 1 is a cross sectional side view of an optical interface with an antireflective film. As those skilled in the art will appreciate, some of the dimensions in this drawing are greatly exaggerated in order to effectively illustrate the optical interference phenomena which are involved. An antireflective film 10 is placed between an incident medium 12 and a substrate medium 14, with the incident medium having a lower index of refraction than the substrate medium. When a ray of light 16 traverses this system, a portion of the light is refracted and a portion is reflected at each interface between different media. Thus the incident ray 16 is divided into a reflected ray 18 and a refracted ray 20 at the boundary between the incident medium 12 and the film 10. Similarly, the refracted ray 20 divides into a reflected ray 22 and a refracted ray 24 at the boundary between the film 10 and the substrate medium 14. This division continues at the incident medium film and film-substrate medium boundaries for each ray which is internally reflected within the film. The antireflective film 10 is equipped with a refractive index profile and a thickness which are appropriate to minimize the total intensity of the rays reflected in the direction opposite to that of the incident ray 16. This minimal reflection is to be accomplished for those light rays with wavelengths within a predetermined range of the optical spectrum.

A linear variation in the refractive index is described by the expression:

$$n(x) = n_i + (n_s - n_i)(x/T) \tag{1}$$

where $n_i$ is the index of refraction of the incident medium, $n_s$ si the index for the substrate medium, and T is the thickness of the antireflecting film. Such a linear variation provides an index profile which is everywhere continuous. The linear profile will reduce the reflectivity considerably as compared with an uncoated substrate, which has an abrupt change in reflect.

A cubic index variation, such that:

$$n(x) = n_i + (n_s - n_i)(3(x/T)^2 - 2(x/T)^3) \tag{2}$$

will generate a distribution which is everywhere continuous in the refractive index as well as its first derivative. This continuous feature improves the antireflective properties of the coating because it reduces the discontinuity in the index at the interfaces with the incident and substrate media. Although one might expect further improvement as increasingly higher order polynomial expressions are used to govern the index variation, I have discovered that higher order polynomial index profiles do not improve antireflective performance beyond the fifth order. As a consequence of this discovery, it is an outstanding feature of this invention to provide an antireflective optical film which effects minimal reflectivity over a broad spectral band. Films made according to this invention possess a quintic refractive index profile with an initial refractive index as close as possible to the refractive index of the incident medium and a final refractive index which is substantially equal to the refractive index of the substrate. The quintic refractive index profile may be defined as:

$$n(x) = n_i + (n_s - n_i)(10(x/T)^3 - 15(x/T)^4 + 6(x/T)^5) \tag{3}$$

Figure 2:
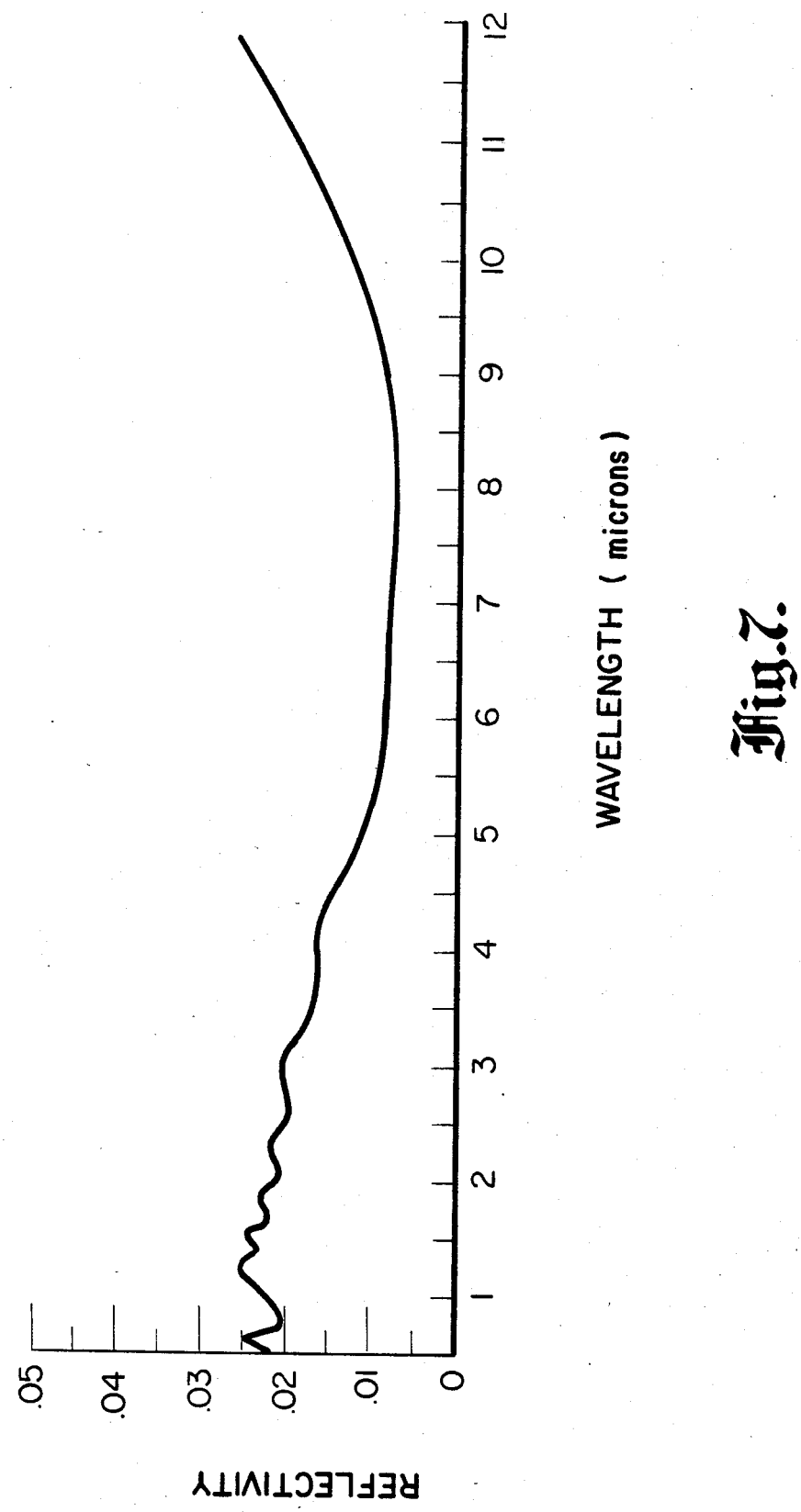
FIG. 2 is a calculated plot of the refractive index as a function of depth in a glass-glass interface antireflective film for linear, cubic, and quintic index variations.

The advantages of a film constructed according to this invention may be illustrated by considering the problem of antireflecting a glass-glass interface between a first dielectric medium with a refractive index of 1.5 and a second dielectric with an index of 2.4. The graded antireflective film is to be 1 μm thick and antireflect over the visible spectrum ($\lambda = 0.4$ to 0.7 μm). FIG. 2 is a calculated plot of the refractive index as a function of depth in such a film for linear, cubic, and quintic index variations, while FIG. 3 is a calculated plot displaying the log of reflectivity as a function of wavelength for those three index profiles. Adding a film with the linear index variation to the interface will reduce the reflectivity to between $10^{-4}$ and $10^{-5}$. While the cubic profile will further improve the reflectivity over the linear profile, FIG. 3 shows that the qunitic profile of this invention provides the best performance.

It is difficult, if not impossible, to actually fabricate a true gradient index profile film because real materials which can be used to make such films offer only limited values of refractive index. A gradient index profile can be approximated, however, by dividing a fixed thickness gradient index film into many incremental layers. The number of layers is chosen to be sufficiently large that ech layer is substantially thinner than wavelengths within the spectral band which is to be antireflected, thereby causing the index variation to appear continuous. Each layer is further divided into a sublayer pair, including a first sublayer with a first refractive index and a second sublayer with a different refractive index. By choosing appropriate thicknesses for the sublayers, the refractive index of each sublayer pair can be made to approximate the average refractive index of the corresponding layer as defined by the quintic profile.

The performance of such a multilayered gradient index film can be further provided by applying a synthesis technique, such as that described by Snedaker, "New Numerical Thin-Film Synthesis Technique", Journal of the Optical Society of America, Volume 72, Page 1732 (1982). With this approach, the reflectivity of the film at several wavelengths over the spectrum is evaluated using conventional matrix theory for homogeneous layers. The index of each layer is then separately adjusted, by varying the thicknesses of the sublayers within the appropriate sublayer pair, to minimize the broadband reflectivity. This technique was applied to the glass-glass interface problem discussed above. The quintic profile was divided into 250 incremental layers and the reflectivity was evaluated at nine evenly spaced wavelengths between and including the spectrum limits of 0.4 and 0.7 µm. FIG. 4 is a plotsimilar to FIG. 3 which illustrates the reflectivity which was calculated for the resulting index profile after 30 passes were made through all 250 of the layers, starting from the quintic distribution. Significant reductions in the reflectivity were thus obtained with only small changes in the index profile. These results indicate that a true optimum profile for eliminating reflections between two dielectrics exists and that the ideal profile looks very much like the quintic profile.

I have found that the quintic index profile minimizes reflection for optical film thicknesses of approximately one wavelength and thicker. For thinner films, the optimum index profile is more complex, and may contain index discontinuities and homogeneous layers. Although ideally the antireflective film will be designed using materials, or composite layers, having refractive indices ranging from that of the incident medium to the index of the substrate, this is not always possible. Frequently, for example, the incident medium is air, whose refractive index of 1 cannot be exactly matched. Even with an interface to air, however, the quintic index profile of this invention provides the optimum reflectivity for broadband antireflection.

The principles of this invention have also been applied to the design and fabrication of a broadband gradient index antireflection coating for a ZnSe substrate, using only two different materials. The coating was fabricated by laser assisted evaporation of the binary compound system $ZnSe:CaF_2$.

The d esign of the film was developed by evaluating the theoretical broadband reflectivity for various gradient layer configurations. It was desirable to keep the total thickness of the film as thin as possible for practical reasons, although performance will generally improve as the thickness of a film is increased. A total thickness of 3 µm was found to provide good performance while nevertheless allowing considerable tolerance for fabrication errors. Even though the index of the initial medium, air, could not be matched, the symmetry of the quintic distribution profile provided the best antireflective performance. Thus the refractive index profile n(x) was given by:

$$n(x) = n_L + (n_H - n_L)(10(x/T)^3 - 15(x/T)^4 + 6(x/T)^5) \quad (4)$$

where x is the depth parameter measured from the air side of the film and $n_L$ and $n_H$ are the lower and upper bounds on the index, with the refractive index of the substrate equal to $n_H$. FIG. 5 is a plot similar to FIGS. 3 and 4 comparing the reflectivity which was calculated for this film with linear and quintic index profiles.

The quintic solution exhibits favorable tolerance properties. Small deviation in total thickness (at least ±10%) and small deviations from the quintic profile do not significantly affect performance. The quintic design also exhibits good angle of incidence performance. Broadband reflectivity is essentially unchanged for angles of incidence from 0″ to beyond 30″. Only a slight loss of performance is experienced at a 45″ angle of incidence.

In fabricating the actual film, the assumption was made that a thin layer (i.e., having an optical thickness much smaller that the wavelengths of interest) with an arbitrary index of refraction may be approximated by a pair of high and low index layers having the same total physical thickness. This assumption leads to a simple algorithm for converting an arbitrary inhomogeneous index profile to one consisting of discrete layers of high and low index materials.

For a given thin homogeneous layer of index n and physical (or geometrical) thickness t, the characteristic matrix M (see Epstein, The Design of Optical Filters, Journal of the Optical Society of America, Volume 42, Page 806 (1952)) is, at normal incidence:

$$M = \begin{pmatrix} \cos\phi & (i/n)\sin\phi \\ in\sin\phi & \cos\phi \end{pmatrix} \quad (5)$$

where the phase thickness $\phi$ is given by:

$$\phi = (2\pi/\lambda)nt \quad (6)$$

for thin layers satisfying:

$$nt < \lambda \quad (7)$$

the trigonometric functions in Equation (5) may be replaced by their small argument approximations, so that M becomes:

$$M = \begin{pmatrix} 1 & i(2\pi/\lambda)t \\ i(2\pi/\lambda)n^2 t & 1 \end{pmatrix} \quad (8)$$

For a combination of two thin layers, a high index ($n_H$, $t_H$) and a low index ($n_L$, $t_L$), the characteristic matrix is found by matrix multiplication of their single layer characteristic matrices to obtain:

$$M = \begin{pmatrix} 1 & i2(\pi/\lambda)(t_H + t_L) \\ i(2\pi/\lambda)(n_H^2 t_H + n_L^2 t_L) & 1 \end{pmatrix} \quad (9)$$

By comparing Equations (8) and (9), a single layer equivalent to the high-low pair can be identified. The conditions are:

$$t = t_H + t_L \quad (10)$$

and $$n^2 = (n_H^2 t_H + n_L^2 t_L)/(t_H + t_L) \quad (11)$$

Given a single layer with index n and thickness t, and two materials with indices $n_H$ and $n_L$, Equations (10) and (11) can be solved for the thicknesses of the high-low pair which is equivalent to the single layer:

$$t_H = t(n^2 - n_L^2)/(n_H^2 - n_L^2) \quad (12)$$

$$t_L = t - t_H \quad (13)$$

The inhomogeneous layer is divided into many thin, discrete layers, the number being sufficient to maintain performance. Each one of these sublayers is then replaced by a two layer approximation whose component thicknesses are specified by equations (12) and (13).

Figure 6:
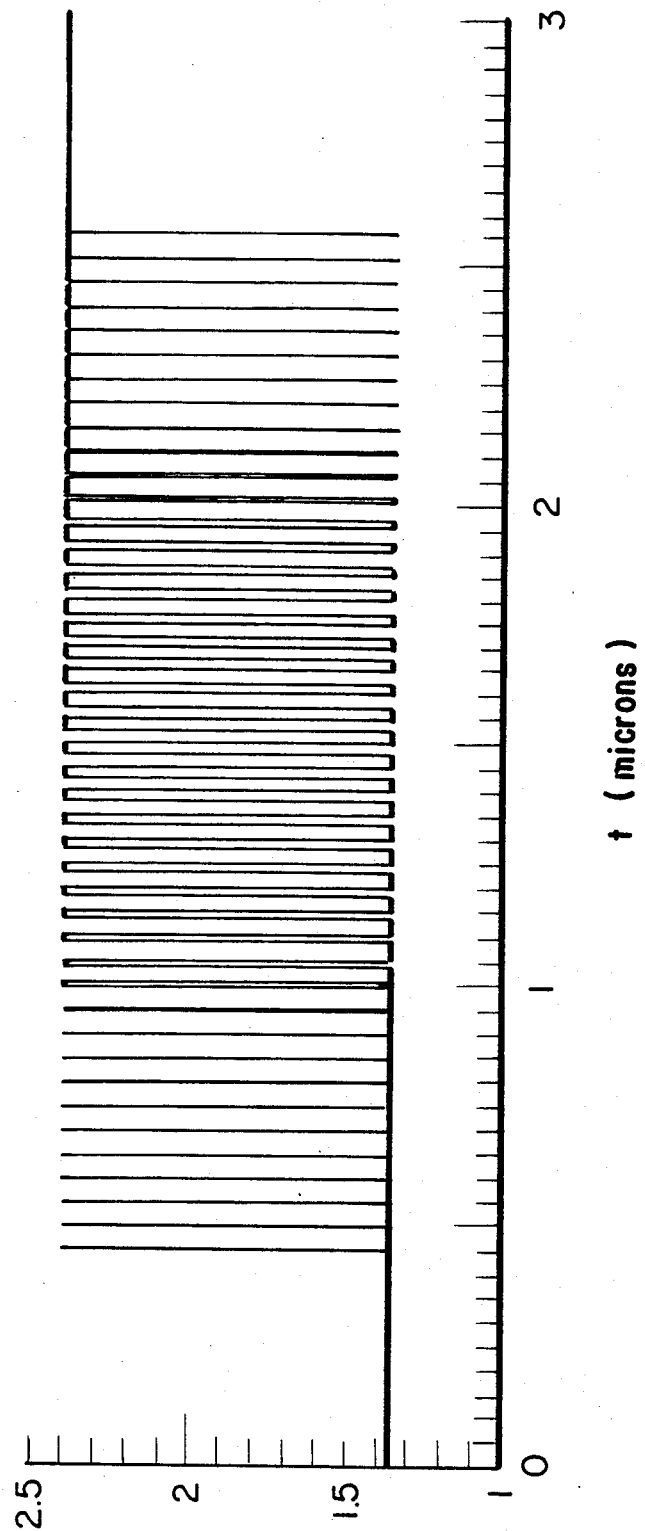
FIG. 6 is an index profile similar to FIG. 2 for the quintic profile of FIG. 5 after synthesis.

In the present example, the quintic profile was subdivided into 60 layers. Each of these layers was then replaced by a high-low layer pair with $n_H = 2.4$ and $n_L = 1.44$, except that layers which were calculated to be less than 10Å thick were excluded. The resulting index profile is shown in the plot of FIG. 6 and the calculated reflectivity performance of this profile is illustrated in FIG. 7. This discrete layer approximation provided adequate performance with 88 layers. Since the high index layer material (ZnSe) was the same as the substrate material, the total deposited coating thickness was reduced to only 2.6 μm.

Figure 8:
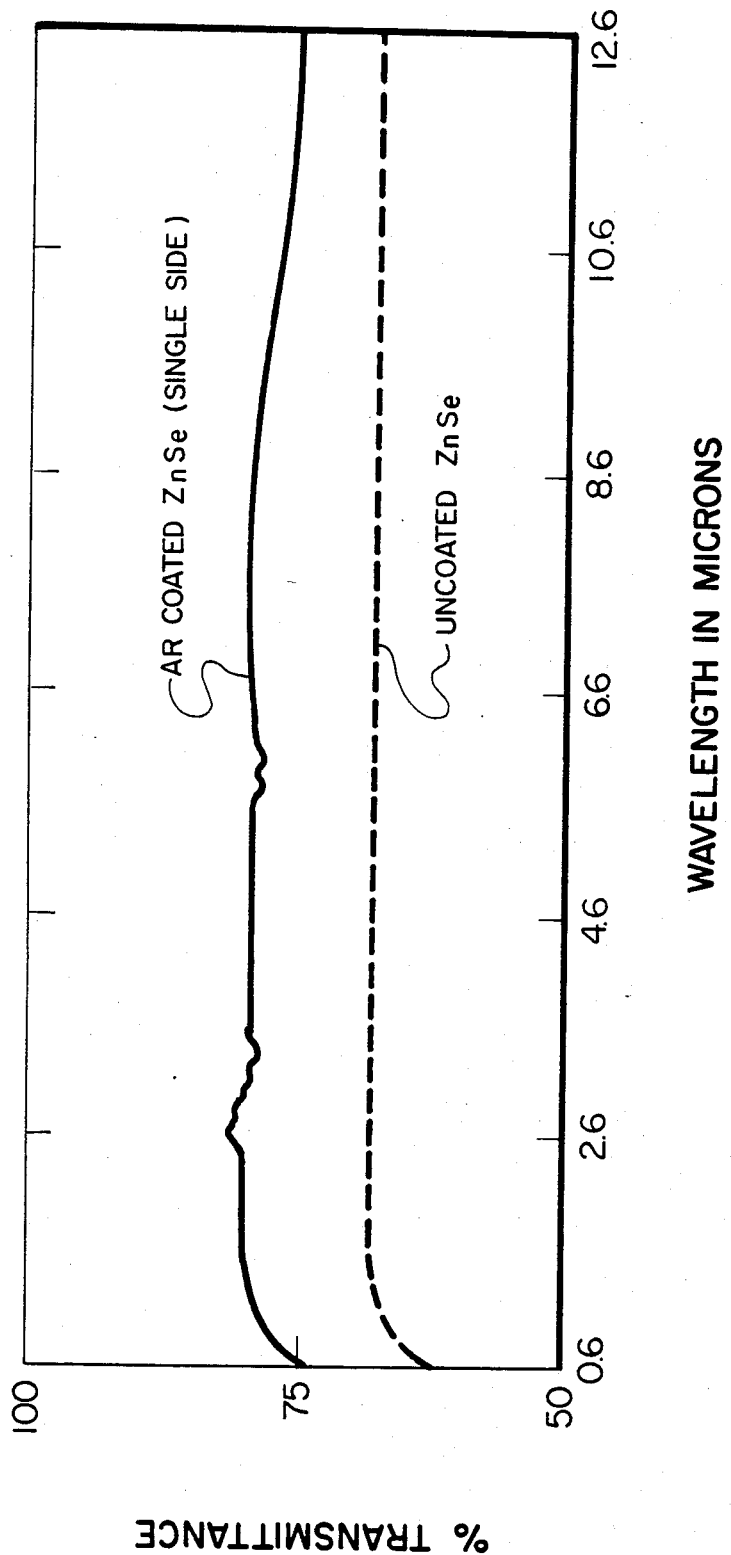
FIG. 8 is a graphical display of the percent transmittance which was measured as a function of wavelength for a substrate coated on one side with a film having the profile of FIG. 6.
Figure 9:
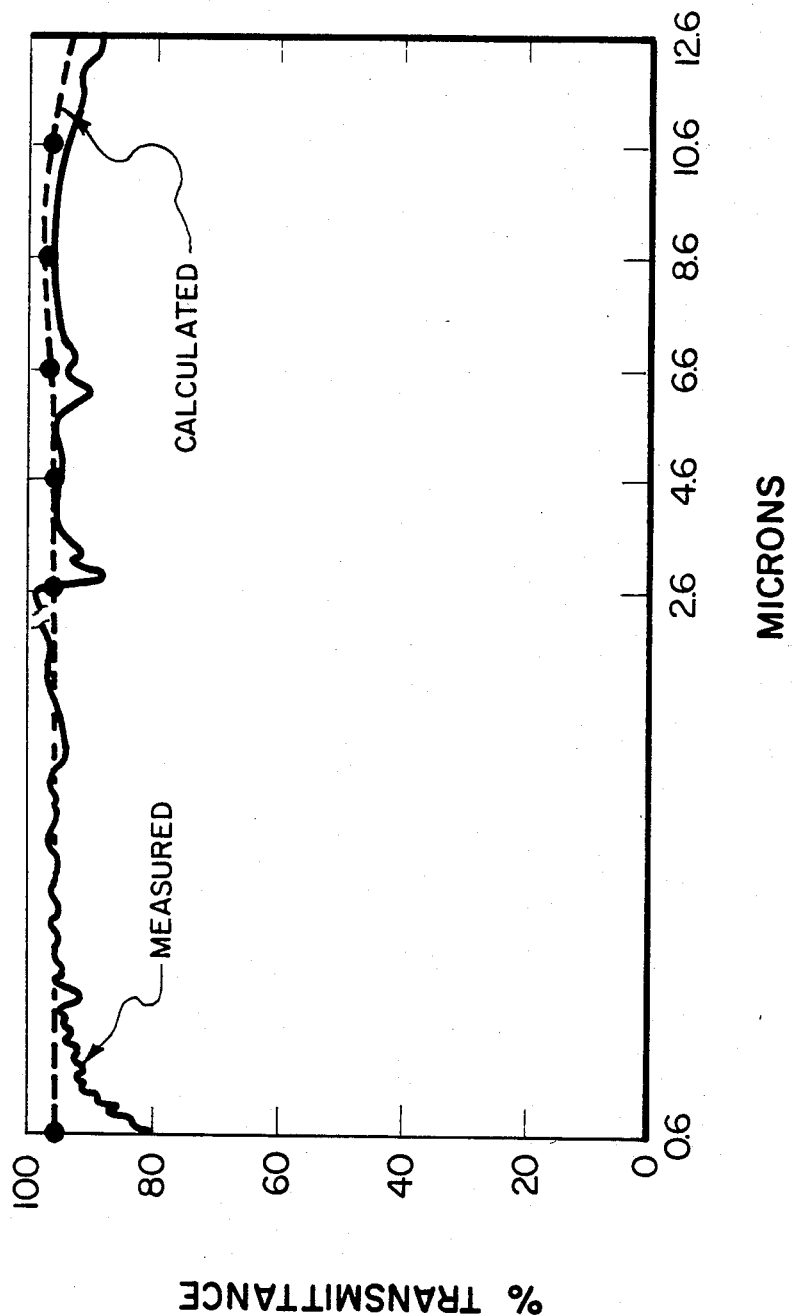
FIG. 9 is a plot similar to FIG. 8, but showing transmittance for a substrate coated on both sides.

The coating deposition was accomplished on 40 mm diameter ZnSe substrates 3 mm thick. The graded index profile was grown in discrete stages of 500Å thickness. The optical performance of the deposited films was measured using visible and infrared spectrophotometers in transmissive modes of operation. FIG. 8 is a plot of percent transmittance as a function of wavelength for a substrated coated on one side, while FIG. 9 is a similar plot of the measured spectra for a substrate coated on both sides. The single-sided coating exhibited a transmittance above 80% over most of the spectral region (0.6 to 12 μm) as compared to 68% for an uncoated substrate. The double-sided coating provided an average 94% transmittance, so that the total reflectance was reduced to 5-6% over this spectral region.

Calculations indicate that the optical structure appears as a continuum to optical radiation when the discrete sublayer optical thickness is a small fraction (e.g., 1/10) of the shortest wavelength for which the structure will be used. These faults were also verified experimentally by growing constant composition layers and measuring the reflect using ellipsometry and/or transmittance spectroscopy.

In conclusion, although several particular embodiments of the invention have been described, modifications and additional embodiments will undoubtedly be apparent to those skilled in the art. Consequently, the exemplary embodiments should be considered as illustrative, rather than inclusive, and the appended claims are intended to define the full scope of the invention.

I claim:

1. An antireflective optical film for placement between an incident medium and a substrate to effect minimal reflectivity from the incident-substrate interface over a broad spectral band, comprising:
   a film having an approximately quintic refractive index profile with an initial refractive index $n_L$ as close as possible to the refractive index of the incident medium and a final refractive index $n_H$ substantially equal to the refractive index of the substrate.

2. The film of claim 1, wherein the refractive index profile of the film is defined by the relationship:

$$n(x) = n_L + (n_H - n_L)(10)x/T)^3) - 15(x/T)^46(x/T)^5)$$

where n(x) is the average refractive index of the film at a depth x in the film relative to the incident surface of the film and T is the thickness of the film.

3. The film of claim 2, wherein the initial refractive index is substantially equal to the refractive index of the incident medium.

4. The film of claim 2, wherein the film further comprises a coating deposited on the substrate.

5. The film of claim 1, wherein the film further comprises:
   a plurality of layers each having a thickness which is no more than one tenth of the smallest wavelength within the spectral band,
   each layer within the plurality being divided into a sublayer pair, including a first sublayer with the refractive index $n_L$ and a second sublayer with the refractive index $n_H$,
   such that the average refractive index of each sublayer pair approaches the average refractive index at 9 corresponding depth in the quintic profile.

6. The film of claim 5, wherein $$t_H = t(n^2 - n_L^2)/(n_H^2 - n_L^2) \text{ and}$$

$$t_L = t - t_H$$

for each of the layers, where t is the thickness of the layer, n is the average refractive index of the sublayer pair, $t_H$ is the thickness of the sublayer with the refractive index $n_H$, and $t_L$ is the thickness of the sublayer with the refractive index $n_L$.

7. An antireflective optical film for placement between an incident medium and a substrate to effect minimal reflectivity from the incident-substrate interface over a broad spectral band,
   the film having an approximately quintic refractive index profile defined by the relationship:

$$n(x) = n_L + (n_H - n_L)(10(x/T)^3 - 15(x/T)^4 + 6(x/T)^5)$$

where n(x) is the average refractive index of the film at a depth x in the film relative to the incident surface of the film, T is the thickness of the film, $n_L$ is the initial refractive index of the film, and $n_H$ is the final refractive index of the film, with $n_L$ as close as possible to the refractive index of the incident medium and $N_H$ substantially equal to the refractive index of the substrate; and comprising:
   a plurality of layers each having a thickness which is no more than one tenth of the smallest wavelength within the spectral band,
   each layer within the plurality being divided into a sublayer pair, including a first sublayer with the refractive index $n_L$ and a second sublayer with the refractive index $n_H$, such that $$t_H = t(n(x)^2 - n_L^2)/(n_H^2 - n_L^2) \text{ and}$$

$$t_L = t - t_H$$

for each of the layers, where t is the thickness of the layer, n(x) is the average refractive index of the layer, x is the average depth of the layer in the film relative to the incident surface of the film, $t_H$ is the thickness of the sublayer with the refractive index $n_H$, and $t_L$ is the thickness of the sublayer with the refractive index $n_L$.

8. A method of making an antireflective optical film for placement between an incident medium and a substrate to effect minimal reflectivity from the incident-substrate interface over a broad spectral band, comprising the steps of:

selecting a theoretical film having a quintic refractive index profile with an initial refractive index $n_L$ as close as possible to the refractive index of the indicent and a final refractive index $n_H$ substantially equal to the refractive index of the substrate;

hypothetically dividing the theoretical film into a plurality of theoretical layers each having a thickness which is no more than one tenth of the smallest wavelength within the spectral band;

determining an average refractive index defined by the quintic profile for each theoretical layer;

subdividing each theoretical layer into a theoretical sublayer pair, including a theoretical sublayer with the refractive index $n_L$ and a theoretical sublayer with the refractive index $n_H$;

adjusting the thicknesses of each theoretical sublayer within the theoretical sublayer pair such that the reflectivity of the theoretical sublayer pair approximates the theoretical reflectivity of the theoretical layer; and depositing on the substrate a plurality of sublayer pairs corresponding in thickness and refractive index to the theoretical sublayer pairs, thereby making an optical film which effects a reflectivity approximating that of the theoretical quintic index profile.

9. The method of claim 8, further comprising, prior to the step of depositing, the steps of:

evaluating the reflectivity of the theoretical film;

selecting a theoretical layer and changing the thicknesses of the corresponding theoretical sublayers to change the refractive index of the theoretical layer;

reevaluating the reflectivity of the theoretical film;

assigning the changed thicknesses to the selected theoretical sublayers if the reflectivity is improved; and repeating a predetermined number of times for each theoretical layer the steps of evaluating, selecting a theoretical layer, reevaluating, and assigning to progressively lower the reflectivity of the theoretical film.

10. The method of claim 8, wherein the step of subdividing further comprises:

subdividing each theoretical layer into a theoretical sublayer pair, including a theoretical sublayer with the refractive index $n_L$ and a theoretical sublayer with the refractive index $n_H$, such that $$t_H = t(n^2 - n_L^2)/(n_H^2 - n_L^2)$$

$$t_L = t - t_H$$

where n is the theoretical average refractive index of the theoretical layer, $t_L$ is the thickness of the theoretical sublayer with the refractive index $n_L$, $t_H$ is the thickness of the theoretical sublayer with the refractive index $n_H$, and t is the thickness of the theoretical sublayer pair.

* * * * *